United States Patent
Frazier et al.

(12)

(10) Patent No.: US 7,363,515 B2
(45) Date of Patent: Apr. 22, 2008

(54) CONTROL SYSTEMS AND METHODS USING A PARTIALLY-OBSERVABLE MARKOV DECISION PROCESS (PO-MDP)

(75) Inventors: Tiffany M. Frazier, Arlington, VA (US); O. Patrick Kreidl, Arlington, VA (US)

(73) Assignee: BAE Systems Advanced Information Technologies Inc., Nashua, NH (US)

( * ) Notice: Subject to any disclaimer, the term of this patent is extended or adjusted under 35 U.S.C. 154(b) by 912 days.

(21) Appl. No.: 10/638,818

(22) Filed: Aug. 11, 2003

(65) Prior Publication Data

US 2004/0064735 A1   Apr. 1, 2004

Related U.S. Application Data

(60) Provisional application No. 60/402,258, filed on Aug. 9, 2002.

(51) Int. Cl.
*H04L 9/00* (2006.01)
*G06F 7/04* (2006.01)
*G06F 17/30* (2006.01)
*G06F 15/16* (2006.01)
*G06K 9/00* (2006.01)

(52) U.S. Cl. .......... 713/201; 713/150; 726/2; 726/22; 726/26

(58) Field of Classification Search .......... 713/150; 726/2, 22, 26
See application file for complete search history.

(56) References Cited

U.S. PATENT DOCUMENTS

| 6,108,597 | A | 8/2000 | Kirchner |
| 6,311,096 | B1 | 10/2001 | Saxena |
| 6,353,814 | B1 | 3/2002 | Weng |
| 6,366,559 | B1 | 4/2002 | Krishnan et al. |
| 2001/0054020 | A1* | 12/2001 | Barth et al. .......... 705/37 |
| 2004/0103296 | A1* | 5/2004 | Harp et al. .......... 713/200 |

OTHER PUBLICATIONS

Frazier T. M., et al..: "Feedback Control Applied to Survivability: A Host-Based Autonomic Defense System," *IEEE Transactions on Reliability*, vol. 53, No. 1, Mar. 2004 (pp. 148-166).
McInerney, J. et al.; "Friars: A Feedback Control System for Information Assurance Using a Markov Decision Process," *Proceedings IEEE 35th Annual 2001 International Carnahan Conference on Security Technology*, Oct. 19, 2001, pp. 223-228.

* cited by examiner

*Primary Examiner*—Nasser Moazzami
*Assistant Examiner*—Chinwendu C Okoronkwo
(74) *Attorney, Agent, or Firm*—Foley Hoag LLP; Stephen B. Deutsch

(57) ABSTRACT

Methods and systems for controlling at least a part of a microprocessor system, that include, based at least in part on objectives of at least one electronic attack, using a partially observable Markov decision process (PO-MDP) to provide a model of at least part of the microprocessor system, the PO-MDP including a controller, the controller including an estimation policy to recursively generate a state estimate at stage k based on a state estimate at stage k−1, a control at stage k−1, and an observation at stage k, and, a response policy to select a control at stage k based on the state estimate at stage k, and cause the selected control to be provided to at least a part of the microprocessor system.

22 Claims, 9 Drawing Sheets

Figure 4.B

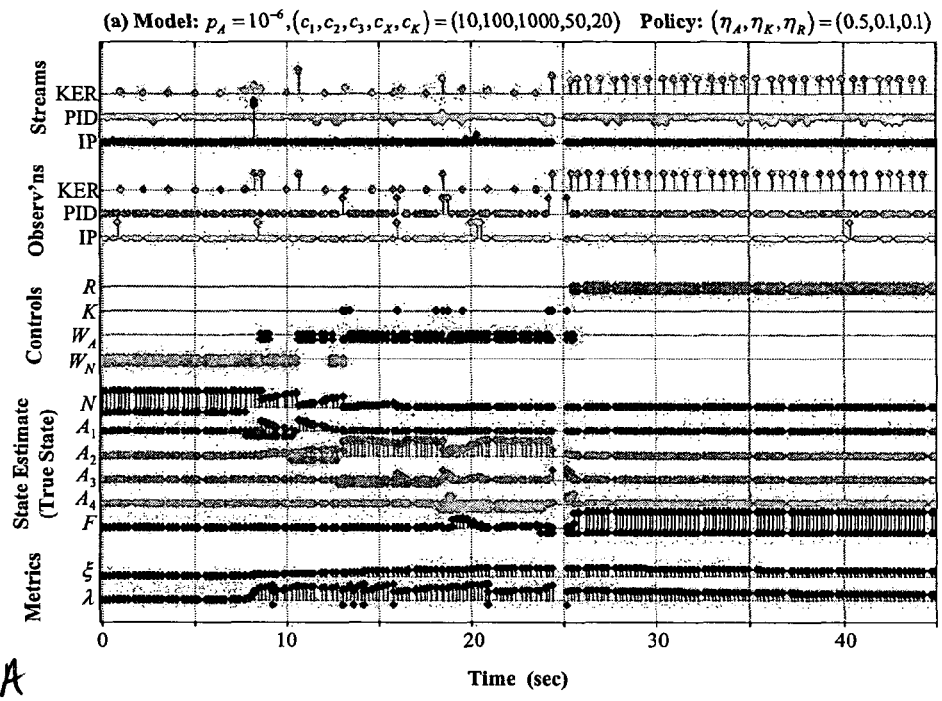
Figure 8A
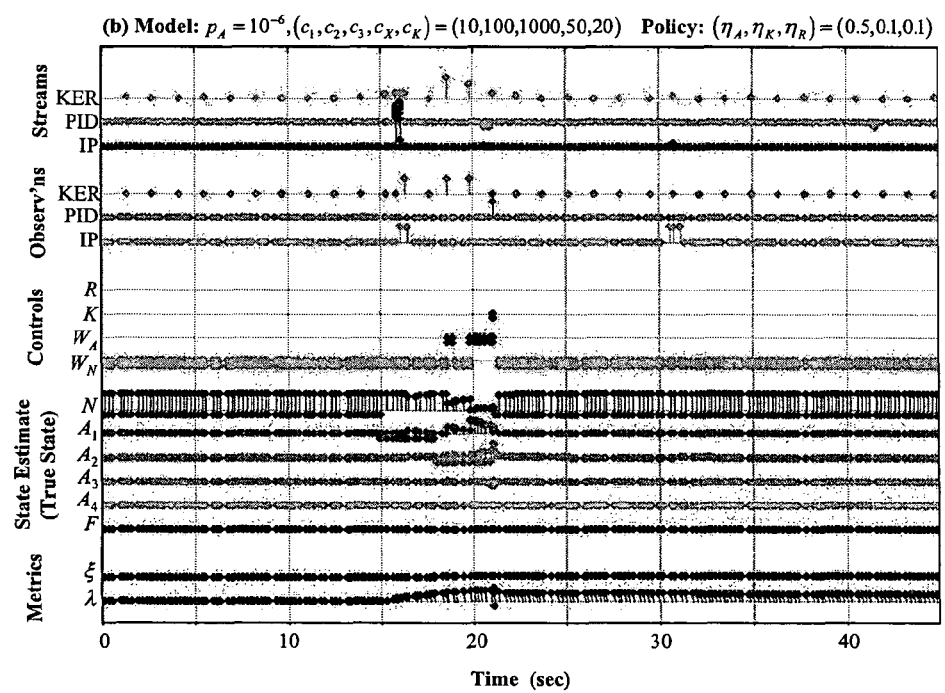
Figure 8.B

CONTROL SYSTEMS AND METHODS USING A PARTIALLY-OBSERVABLE MARKOV DECISION PROCESS (PO-MDP)

CLAIM OF PRIORITY

This application claims priority to U.S. Ser. No. 60/402,258, entitled "Feedback Control Applied to Survivability: A Host-Based Autonomic Defense System", and filed on Aug. 9, 2002, naming Tiffany M. Frazier and O. Patrick Kreidl as inventors, the contents of which are herein incorporated by reference in their entirety.

STATEMENT OF GOVERNMENT INTEREST

The disclosed methods and systems were developed with support from the Space and Naval Warfare Systems Center, San Diego, under Contract No. N66001-00-C-8030. The U.S. government may have certain rights in the disclosed methods and systems.

BACKGROUND (1) Field

The disclosed methods and systems relate generally to control systems, and more particularly to control systems using a partially-observable Markov decision process (PO-MDP).

(2) Description of Relevant Art

An increasing reliance on information systems within often critical military and civilian operations, coupled with a proliferation of malicious intrusive electronic activity, provides motivation for continued improvements in computer and other microprocessor-controlled device security. Malicious intrusions can be described and understood at different levels that can include information system impact (e.g., denial of service, theft of service, etc.), and attacker objectives (e.g., defacing a government web server in order to make a political statement). Often, an intelligent attacker can automate successive intrusion attempts, perhaps even mutating certain properties before different attempts to evade or bypass static security mechanisms.

Survivability can be understood as a capability of an information system to dynamically preserve its essential functionality and computational performance in the presence of security intrusions. When considering the dynamic and uncertain nature of security failures due to malicious intrusions, a survivability objective can thus include offline techniques employed during design, which can be supplemented by online techniques employed during operation. Proven design paradigms for fault-tolerant and safety-critical systems also suggest survivability can be achieved through a sequence of system partitioning, subsystem design, and system-wide integration. For example, improved survivability of a single computer within a networked information system can provide a first level of defense to allow upper-level components of a multi-layer security architecture react with more coordinated diagnosis and counterattack strategies to improve global security.

SUMMARY

Disclosed herein are methods and systems for controlling a microprocessor system, where the methods and systems include, based at least in part on objectives of at least one electronic attack, using a partially observable Markov decision process (PO-MDP) to provide a model of at least part of the microprocessor system, where the PO-MDP includes a controller, and the controller includes: (i) an estimation policy to recursively generate a state estimate at stage k based on a state estimate at stage k−1, a control at stage k−1, and an observation at stage k, and, (ii) a response policy to select a control at stage k based on the state estimate at stage k, and cause the selected control to be provided to at least a part of the microprocessor system. As provided herein, the "objectives" can include, for example, the effects on the microprocessor system (or part thereof), the phases of the attack, the characteristics of the attack, and/or other characteristics and/or features of the electronic attack. Further, an "electronic attack" can be understood herein to include a type of electronic intrusion, and may not be limited to an "attack."

The modeling using the PO-MDP can include collecting one or more training sets based on a sample electronic attack, where the data can be collected from one or more sensors, where the one or more sensors can be in communications with at least part of the microprocessor system. The collecting can also include determining sensor observation probabilities.

The disclosed methods and systems can include selecting the estimation policy and the response policy to minimize an average cost per stage. The selection can occur such that the response policy can be selected based an infinite-horizon assumption (e.g., optimal) and/or a multi-state look-ahead (e.g., sub-optimal) optimization technique. The estimation policy selection can include constructing a recursive estimator to provide a sufficient statistical state estimate.

As disclosed herein, the estimation policy can be selected based on minimizing an error per stage, which can include determining a distance metric. In some embodiments, the distance metric can include a determined difference between an estimate of each state of the model, and the true state. In one embodiment, the distance metric can include computation of a Euclidean norm. The response policy can be selected based on a fixed estimation policy and minimizing the average cost per stage. The average cost per stage can be minimized by determining a minimum cost-to-go based on the state estimate at stage k.

The disclosed methods and systems thus include receiving observations from one or more sensors at stage k, where the sensor(s) can be in communications with the microprocessor system (or at least part thereof), and, associating the observations with observation probabilities based on the state estimate at stage k and the control at stage k−1. A distance measure can be produced based on the received observations, and the received observations can be applied to a detection scheme that can include, for example, a Bayesian classifier.

The disclosed methods and systems can include specifying a state space associated with the model, a control space associated with the model, and/or an observation space associated with the model. Additionally and/or optionally, the methods and systems can include specifying one or more state transition probabilities for a state at stage k+1 based on the state at stage k and a control at stage k. Also included in the methods and systems can be specifying one or more sensor observation probabilities for stage k based on a state at stage k and a control at stage k−1.

The disclosed model may thus include states of at least part of an electronic intrusion and/or an electronic attack (as provided herein) based on at least a part of a microprocessor-controlled device and/or a set of instructions. In one embodiment, the model is a stationary model.

Also disclosed is a system for controlling at least a part of a microprocessor device, where the system includes a partially observable Markov decision process (PO-MDP) controller, and where the PO-MDP controller includes: two or more states based on one or more objectives of an electronic attack, one or more state transition probabilities based on a state at a stage k and a control at a stage k, one or more sensor observation probabilities based on the state at stage k and a control at a stage k−1, one or more state transition costs based on the state at stage k, the control at stage k−1, and a state estimate for stage k+1, a recursive estimator to generate a probabilistic state estimate for stage k, and, a response policy to associate the probabilistic state estimate to a control for stage k. The recursive estimator can compute a sufficient statistic. The probabilistic state estimate can be a sufficient statistic. The control system can include one or more actuators to affect the control for stage k, where the actuator can be in communications with the microprocessor device/system (and/or part thereof being controlled), and further, the system can include one or more sensors to provide one or more sensor observations based on the system (or part thereof).

The sensor observation(s) can include sensor observations based on a process activity(s) associated with the system, a network activity(s) associated with the system, and/or a kernel activity(s) associated with the system. As provided herein, the system can include at least a part of a microprocessor-controlled device and/or a set of instructions.

For the disclosed systems and methods, the system states can include one or more states associated with an electronic attack and/or an electronic intrusion, etc. The control for stage k can include, for example, a default process and/or a kill process.

Other objects and advantages will become apparent hereinafter in view of the specification and drawings.

BRIEF DESCRIPTION OF THE DRAWINGS

FIGS. 4A and 4B includes exemplary system models for an exemplary embodiment according to FIG. 3;

FIGS. 8A and 8B include exemplary data for one embodiment of the disclosed methods and systems using a feedback controller and a "heuristic" policy with actuation disabled and enabled, respectively, for a second shell exploit; and, FIGS. 9A and 9B include a comparison of a rule-based controller and a feedback controller, respectively, for a given shell exploit.

DESCRIPTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the disclosed systems or methods.

The disclosed methods and systems employ feedback control theory to provide a defense system for a host device or system (otherwise referred to as a "host system") that can be a microprocessor-controlled device or system. In one embodiment, the methods and systems can combine substantially real-time sensing of locally apparent electronic intrusive activity with automated response selection to provide a defense mechanism for the host system.

In one embodiment, the disclosed methods and systems can employ sensors, where such sensors can provide and/or otherwise generate data that can be used to estimate a current state of the host system. Some exemplary host system states can include or otherwise be associated with "not under attack," "no intrusion(s) detected," "being probed for vulnerability(s)," "being scanned for vulnerability(s)," "under attack," and/or others, with such examples provided for illustration and not limitation. Based on an estimate of the host system state, a control policy can be selected to effect a response. Example responses can include eliminating a software task/module, disconnecting a device and/or connection, performing a host system shutdown, and/or others, with such examples provided for illustration and not limitation. Such response(s) can be achieved through the use of an "actuator." As provided herein, an "actuator" can be understood to be hardware, software ("instructions"), or a combination thereof, and can further be understood generally to include a response mechanism that further includes actions to obtain the response dictated by a selected control policy. In some embodiments, one possible actuator may include no instructions and/or hardware action/effect, and such actuator may thus be understood to provide no response.

Figure 1:
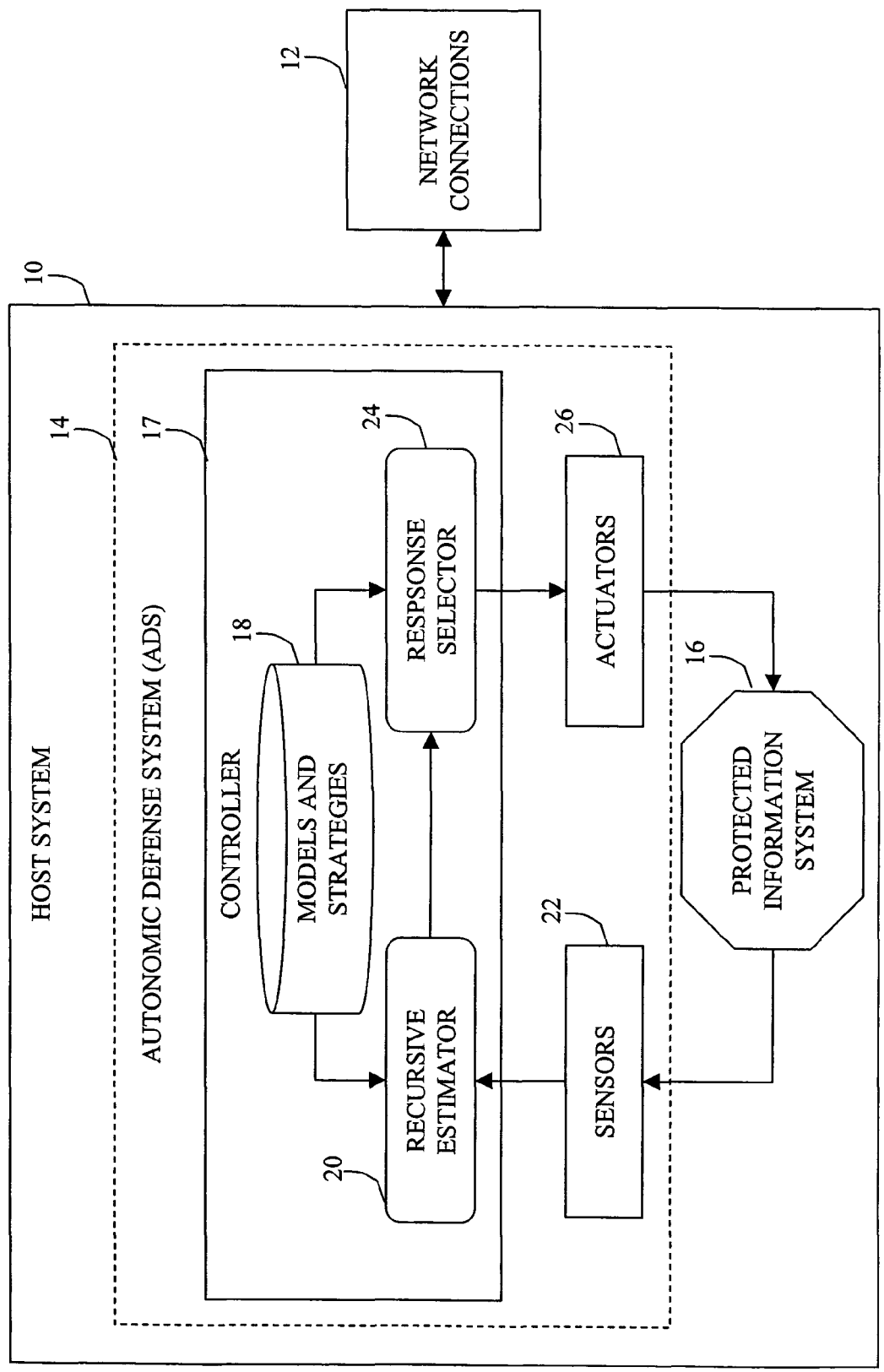
FIG. 1 includes a representative system for the disclosed methods and systems.

FIG. 1 illustrates one embodiment of the disclosed methods and systems that includes a host system 10 that can be connected via hardware and/or software to various other systems and/or devices via network connections 12. As the FIG. 1 exemplary embodiment indicates, the host system 10 can include a "defense system" otherwise referred to herein as an Autonomic Defense System (ADS) 14, that can be used to defend, protect, and/or otherwise provide control to affect a protected information system 16. The protected information system can include a hardware and/or a software component. The use of the terms "defense system" and/or ADS is merely for convenience, and the disclosed methods and systems can be understood to include other types and variations of such methods and systems.

As shown in the FIG. 1 embodiment, the illustrated ADS 14 can include a controller 17 that can further include control models, strategies, and/or policies 18, a recursive estimator 20 that can receive data from one or more sensors 22 and based on the sensor(s) data and the control models 18, formulate an estimate of the host system state, and, a response selector 24 that can receive the host system state estimate from the recursive estimator 20 and based on the state estimate and the control models 18, select an actuator 26 to effect a desired response that can affect the protected information system 16 to provide the desired response according to the state estimate and the control model(s) 18. FIG. 1 thus shows how the sensor(s) 22 can further continue to receive data from the protected information system 16 (e.g., during and after a response(s) is provided by an actuator(s)) to facilitate a new state estimate by the recursive estimator 20, and thereafter, a selection of an actuator 26. The FIG. 1 sensor(s) 22 can be intrusion sensors, for example, that can be hardware, software, and/or a combination thereof. The FIG. 1 embodiment thus includes a feedback control loop to facilitate the control policies 18 for the protected information system 16.

Generally and with respect to the illustrated system of FIG. 1, feedback control can be understood to include a process of receiving new observations (e.g., from sensors 22), estimating the implication of such observations based on past observations and past responses, and using that estimate to select a new response (e.g., via response selector 24). With regard to embodiments for protecting a host system 10 from an electronic intrusion, the nature of the intrusion, the implications of a sensor(s) observation(s), and/or the outcome of an actuator response may not be entirely predictable or certain. The disclosed methods and systems accordingly employ statistical models to account for such unpredictability and/or uncertainty.

With further reference to the exemplary system of FIG. 1, it can be understood that the purpose of the ADS 14 is to increase the likelihood of the continued existence and/or performance of the protected information system 16 regardless of the presence of intrusions. Accordingly, such ADS purpose can be deemed a "survivability objective" of the ADS 14, where the survivability objective can be expressed as a statistical minimization of a certain mathematical cost, where the mathematical cost quantifies a balance between (i) an overall maintenance cost associated with a defensive response that reduces the probability of an attack's completion, and (ii) an overall failure cost associated with the attack's completion. Those of ordinary skill in the art will recognize that such minimization can be performed in a variety of manners based on the embodiment, and thus the minimization can be based on statistical, probabilistic, and other system features related to a particular embodiment, the variations and/or combinations thereof being contemplated within the scope of the disclosed methods and systems.

For the disclosed methods and systems, a feedback control can include three mathematical models: (i) a multi-stage system model that can characterize the stochastic evolution of a host system state and its dependence on control; (ii) a cost function that can characterize a relative undesirability of possible controls and single-stage outcomes defined by the host system model; and (iii) unless assuming the controller has perfect access to the true system state, a multi-stage observation model that can characterize the control-dependent statistical correlation of observations, or processed measurements, with the true state.

For the disclosed methods and systems, a state can be understood according to Markovian assumptions so that knowledge of the state's current value implies that additional information about the past is redundant or irrelevant for choosing future controls. Further, as provided herein, a control can be understood as a response that is available to the controller 17 and has potential to influence the outcome of present and/or future decision stages. Active controls can be understood to include responses that may directly alter the true state of the system, while passive controls may influence how observations are made in the future. A control may thus be simultaneously active and passive, thus influencing both future states and future observations.

One of ordinary skill will recognize the control theory concepts of controllability, observability, and stability. Controllability can refer to a measure of how effective controls are with respect to altering the true state. If a state is uncontrollable, applying control has no predictable influence on how the future evolves from that state. Conversely, complete controllability implies that it is possible through some finite sequence of actions to alter the true system state to another desired system state.

Observability refers to a measure of how informative the sensor observations are with respect to estimating the true system state. If a system state is unobservable, the sensor observations have no useful information content to help infer that true system state. Alternately, complete observability implies it is possible through some finite sequence of observations to uniquely determine the true system state.

Stability refers to a system which, in the absence of external input, eventually settles and/or otherwise resolves to some equilibrium state. When stability of the controlled system is not satisfied, an objective is generally to immediately stabilize the system, for only upon stabilization is it generally possible to proceed with objectives to improve controller performance. Provided the system model is at least a partially controllable characterization of the system, the observation model is at least a partially observable characterization of the system, and the stability guarantees are preserved, the aforementioned cost function allows the system performance issue to be stated in a manner suited for mathematical optimization.

For the disclosed methods and system, an "optimal" solution or references otherwise to optimized and/or optimal can be understood to include a mathematical minimization of a respective cost function, where it can be understood that different minimization techniques can be employed and are contemplated within the scope of the disclosed methods and systems.

Some techniques, including dynamic programming techniques, can treat imperfect state information problems no differently from perfect state information problems. Instead of a control strategy relying on the true system state which summarizes the essential context, there is a "state of information" which summarizes the observable context that includes received observations and past controls. With imperfect state information, stages of an on-line control strategy can be decomposed into two phases that involve a statistical estimate of the true state: (i) an estimation policy that recursively generates the current state estimate based on the previous state estimate, preceding control, and the current observation; and, thereafter (ii) a response policy that selects the current control based on the resulting current state estimate.

Ideally, recursive estimates are equivalent in directly providing a controller with observable data to reach a control decision, and this property can be understood to be "sufficient."

Markov Decision Process (MDP) models describe a particular class of multi-stage feedback control problems in operations research, economics, computer, communications networks, and other areas. A finite-state, finite-control MDP model can be applicable when, at each decision stage, response selection from a finite set of possible actions depends on only a finite set of considerations.

A Partially-Observable (PO) MDP model can assume imperfect state information where a controller receives, at each stage, one of a finite set of possible sensor observations. A finite-state, finite-control, finite-observation PO-MDP can, under certain technical conditions, be reformulated to an equivalent MDP involving the same finite control-space, and an infinite state space corresponding to the possible values of the probabilistic state, or a sufficient statistic having the intuitive form of a probability distribution on the original finite state-space. Moreover, the recursive estimation policy that generates successive probabilistic state estimates has a closed-form optimal solution.

In describing an exemplary PO-MDP as provided herein and in relation to the disclosed methods and systems, the following notation and acronyms are used:

ADS: Autonomic Defense System;
ATCK: event tag in data collection designating a message about an attack step;
DFLT: event tag in data collection designating a command to the default actuator;
IP: event tag in data collection designating a sensor report about network activity;
KER: event tag in data collection designating a sensor report about kernel activity;
KILL: event tag in data collection designating a command to the kill-process actuator;
MDP: Markov Decision Process;
NRML: event tag in data collection designating a message about web-server load;
PID: event tag in data collection designating a sensor report about process activity;
PO-MDP: Partially Observable Markov Decision Process;
RCVR: event tag in data collection designating a command to the recovery actuator;
$S=\{1, 2, \ldots, n\}$: discrete, finite state space of dimension n;
$C=\{1, 2, \ldots, m\}$: discrete, finite control space of dimension m;
$Z=\{1, 2, \ldots, q\}$: discrete, finite observation space of dimension q,
k: decision stage index;
$x_k \epsilon S$: state of the process during stage k;
$z_k \epsilon Z$: observation received in stage k;
$u_k \epsilon C$: control applied in stage k;
$I_k(z_k, u_{k-1}, I_{k-1})$: all observable information prior to selecting control $u_k$;
$B_k = Pr(x_{k+1}|x_k, u_k)$: probabilistic state estimate prior to selecting control $u_k$;
$Pr(x_{k+1}|x_k, u_k)$: state transition probabilities;
F: system model, a family of m n×n transition probability matrices;
$c(x_k, u_k, x_{k+1})$: state transition costs;
G: cost function, a family of m n×n transition cost matrices;
$Pr(z_k|x_k, u_{k-1})$: sensor observation probabilities;
H: observation model, a family of m n×q observation probability matrices;
$B_k = \phi(z_k, u_{k-1}, B_{k-1})$: estimation policy recursively generating the probabilistic state;
$u_k = \mu(B_k)$: response policy mapping each estimate to the desired control;
$\xi(\phi|H, F)$: infinite-horizon average error per stage, an estimation metric;
$\lambda(\phi, \mu|H, F, G)$: infinite-horizon average cost per stage, a controller metric;
$\alpha(a)$: expected cost-to-go vectors associated with selecting each control $a \epsilon C$;
$Y = \delta(D)$: decision rule mapping measurement $D \epsilon \mathfrak{R}$ to detector output $Y \epsilon \{0,1\}$;
$J(\gamma)$: expected detection cost associated with binary threshold $\gamma \epsilon \mathfrak{R}$;
$Pr(D|x_k)$: measurement distribution for optimized detector threshold selection;
$Pr(x_k)$: prior probability distribution for optimized detector threshold selection;
$C(Y, x_k)$: detector cost function for optimized binary threshold selection.

A stationary MDP involving a finite set of states and a finite set of controls can be structurally characterized by a state space s of n distinct states, or $S=\{1, 2, \ldots, n\}$, and a control space C of m distinct controls, or $C=\{1, 2, \ldots, m\}$. Consider a sequence of decision stages where each stage k begins in one of the n states, $x_k \epsilon S$. The controller then selects one of the m controls, $u_k \epsilon C$, upon which a transition to the next state, $x_{k+1} \epsilon S$, occurs according to $mn^2$ known state transition probabilities, $Pr(x_{k+1}|x_k, u_k)$. The state transition event can simultaneously end the kth decision stage and begin the next decision stage. The conditional dependence of the transition probabilities on the current state $x_k$, and the selected control $u_k$ reflects the extent to which anticipated dynamics and the outcomes of the active controls can be modeled. The relative undesirability of the $mn^2$ possible single-stage outcomes involving the current state $x_k$, applied control $u_k$, and next state $x_{k+1}$, can be quantified by state transition costs $c(x_k, u_k, x_{k+1})$. It may b noted that in this embodiment, the arguments of the transition costs, $(x_k, u_k, x_{k+1})$, are identical to the arguments that define the possible single-stage outcome in the system model.

We assume the controller cannot access the exact state $x_k$ but instead receives one sensor observation $z_k$ prior to selecting a control $u_k$. A finite-observation PO-MDP is structurally characterized by an observation space Z of q distinct sensor observations, or $Z=\{1, 2, \ldots, q\}$, in addition to a state space S and a control space C. Observations $z_k \epsilon Z$ occur according to mnq known sensor observation probabilities $Pr(z_k|x_k, u_{k-1})$. The conditional dependence of the observation probabilities on the current state $x_k$ and the previously selected control $u_{k-1}$ reflects the extent to which the anticipated implications of a sensor observation and the outcomes of the passive controls can be modeled.

The parameters of a stationary finite-state, finite-control, finite-observation PO-MDP model can be organized into a family of control-dependent matrices: m n×n transition probability matrices F, m n×n transition cost matrices G, and m n×q observation probability matrices H. More precisely, for each $i, j \epsilon S$ and $a \epsilon C$, let the given transition probability $Pr(x_k=j|x_k=i, u_k=a)$ correspond to the element in the ith row and jth column of matrix F(a). Similarly, let the given transition costs $c(x_k=i, u_k=a, x_{k+1}=j)$ populate the matrices G(a). Further, for each $i \epsilon S$, $a \epsilon C$, and $o \epsilon Z$, let the given observation probability $Pr(z_k=o|x_k=i, U_{k-1}=a)$ correspond to the ith row and oth column of matrix H(a).

The aforementioned stationary PO-MDP model may utilize an infinite-horizon assumption so the optimal control strategy is also stationary, although as provided herein, in certain embodiments, a multi-state look-ahead optimization scheme can be used. It can be understood that a multi-state look ahead can provide a sub-optimal scheme. The stationary PO-MDP model also satisfies technical assumptions to utilize the probabilistic state estimate as a sufficient statistic and optimally decompose the feedback controller into a recursive estimator followed by a response selector, as provided in FIG. 1. Specifically, let $I_k$ denote observable information received prior to selecting the kth control $u_k$. Let $B_k$ denote the stage k estimate having the form of a column vector of length n whose ith element is $Pr(x_k=i|I_k)$. Note that each probabilistic state estimate is an element from the uncountable space, $$B_k \in \left\{ v \in [0,1]^n \;\middle|\; \sum_{x=1}^{n} [v]_x = 1.0 \right\}$$

where $[v]_i$ denotes the ith component of a vector v, and $[v]_x$ is evaluated for x=1, 2, ..., n. Intuitively, each ith element of $B_k$ represents a relative confidence that state i is indeed the true state in stage k. Thus, if state i is the true state, $B_k$ is a unit vector in the ith component, and conversely, when no meaningful information has been provided to the estimator, $B_k$ can be the uniform distribution over the n states.

Based on the probabilistic state estimate, stages of the control strategy can be implemented via: (i) an estimation policy $\phi$ that outputs each estimate $B_k$ according to a recursion given by:

$$B_k = \phi(z_k, u_{k-1}, B_{k-1}) \qquad (1)$$

where $z_k$ denotes the current observation, $u_{k-1}$ the preceding control, and $B_{k-1}$ the preceding estimate; and, (ii) a response policy $\mu$ that provides a selected control $u_k$ according to $$u_k = \mu(B_k). \qquad (2)$$

Figure 2:
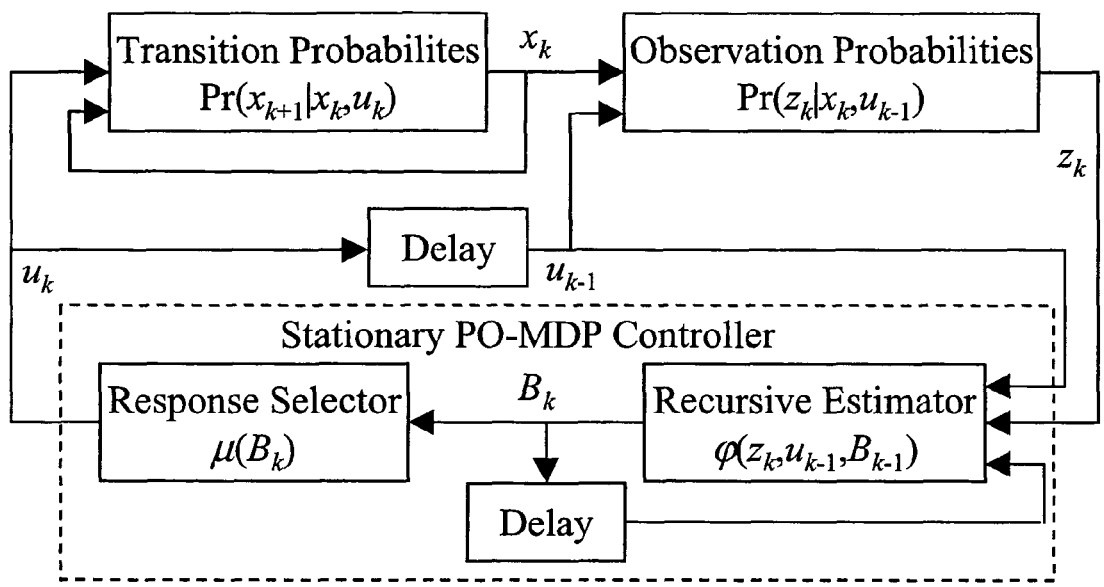
FIG. 2 provides an exemplary representation of one partially observable Markov Decision Process (PO-MDP) as disclosed herein.

FIG. 2 depicts the aforementioned controller decomposition, the associated online data flows characterizing decision stages, and the system and observation models. Note that the cost function influences the optimization that yields desirable response policies.

Consider a specific stationary PO-MDP model characterized by the family of matrices F, G, and H. Let $d(B_k, x_k)$ denote a given distance metric between the statistic $B_k$ and the true state $x_k$. For a probabilistic state estimate, a valid distance metric is:

$$d(B_k, x_k) = \frac{1}{\sqrt{2}} \|B_k - 1_n(x_k)\| \qquad (3)$$

where $\|\;\|$ denotes the Euclidean norm and $1_l(i)$ denotes the ith unit vector in an l-dimensional vector space. Dividing by $\sqrt{2}$ normalizes the error distance to units of probability. Accordingly, for a specific estimation policy $\phi$ of the form in (1), the average error per stage can be represented by:

$$\xi(\varphi \mid H, F) = \lim_{K \to \infty} \frac{\xi(\varphi \mid H, F)}{K} = \lim_{K \to \infty} E\left[\sum_{i=0}^{K-1} d(B_k, x_k) \mid H, \varphi, F\right] \qquad (4)$$

where the expectation E[ ] is over random variables implied by the probabilities F and H and the particular estimation policy $\phi$. Also given a specific response policy $\mu$ of the form in (2), the average cost per stage can be represented as:

$$\lambda(\varphi, \mu \mid H, F, G) = \qquad (5)$$

$$\lim_{K \to \infty} \frac{\lambda_k(\varphi, \mu \mid H, F, G)}{K} = \lim_{K \to \infty} \frac{1}{K} E\left[\sum_{k=0}^{K-1} c(x_k, \mu(B_k), x_{k+1}) \mid H, \varphi, F\right]$$

where the expectation E[ ] is as in (4).

In general, the overall control objective is to minimize the average cost per state, $\lambda$ in (5), with the simultaneous design of estimation and response policies, $\phi$ and $\mu$. When the statistical estimate is known to be sufficient, the overall control objective can be decomposed into isolated estimation and response objectives without loss of optimality. The overall estimation objective is to minimize $\xi$ in (4) with the design of estimation policy $\phi$. For the stationary PO-MDP model, probabilistic analysis yields the optimal estimation policy, denoted by $\phi^*$, via the closed-form recursion:

$$\varphi^*(z_k = o, u_{k-1} = a, B_{k-1}) = \frac{[H(a)]_o * [F(a)' B_{k-1}]}{[H(a)]_o' * [F(a)' B_{k-1}]} \qquad (6)$$

where generally,

"A'" can be understood to denote the transpose of a matrix "A," and,

"$[A]_o$" can be understood to denote the column vector corresponding to the oth column of a matrix A; and, specifically, where:

$[v]_i$ is the ith coordinate of a vector v, and, v1*v2 is the vector whose ith coordinate is the scalar $[v_1]_i[v_2]_i$.

Once the estimation policy $\phi^*$ is fixed, the overall response objective is to minimize $\lambda$ in (5) with the design of response policy $\mu$. Mathematical analysis reduces the form of the optimal stationary response policy, denoted by $\mu^*$, to satisfy:

$$\mu*(B_k) = \operatorname*{argmin}_{a \in C} [\alpha * (a)' B_k] \qquad (7)$$

where $\alpha^*(1), \ldots, \alpha^*(m)$ are real-valued vectors of length n that, optimally, depend on the model parameters. Conceptually, the ith element of each vector $\alpha^*(a)$ is proportional to the optimal cost-to-go, or the expected total cost to be incurred in the future, given the current state $x_k=i$, the current stage decision is control $u_k=a$, and future decision stages continue to make statistically optimal decisions as provided herein. Note that the minimization in (7) is mapping to the action that achieves the minimum expected cost-to-go, conditioned on the current probabilistic state estimate $B_k$.

Together, the controllability and observability properties of the modeled PO-MDP correspond to the achievable performance of a control strategy. Once the controllability and observability properties are deemed acceptable, the following technical assumptions should be satisfied for the simplest recursive state estimator $\phi^*$ and the response selector $\mu^*$ provided by (6) and (7), respectively, to apply: (i) the stationary model applies over an infinite number of stages, implying the control strategy is stationary; (ii) conditioned on the true state and previous control, the observation distribution at each stage s is independent from information related to past decision stages; and (iii) sensor measurement and actuator response delays are negligible compared to the typical duration of each decision stage.

In practice, the first assumption is never strictly satisfied but (6) and (7) may still perform well when the process parameters vary slowly over a large number of stages. Further, the second assumption implies the recursive estimates generated by (6) are sufficient, allowing the feedback controller to be decomposed into a recursive estimator followed by a response selector without loss of optimality. The assumption is usually not satisfied in practice; for example, a single sensor stream may be correlated with itself across time and multiple sensor streams may be cross-correlated. Regardless, the controller decomposition is typically exercised in the interest of tractability. Utilizing correlation filters when processing incoming measurements is one way to yield an observation stream that may better satisfy the assumption, which introduces additional computational expense to stages of online operation. The third assumption allows the simple matrix-based models and computations defined by (1)-(7) to suffice in generating estimates and selecting controls. If delays are significant, the system model can be generalized to include a temporal-dependence on the transition probabilities used in each decision stage. Unfortunately, using correlated sensors can add computational expense to stages of online operation.

Figure 3:
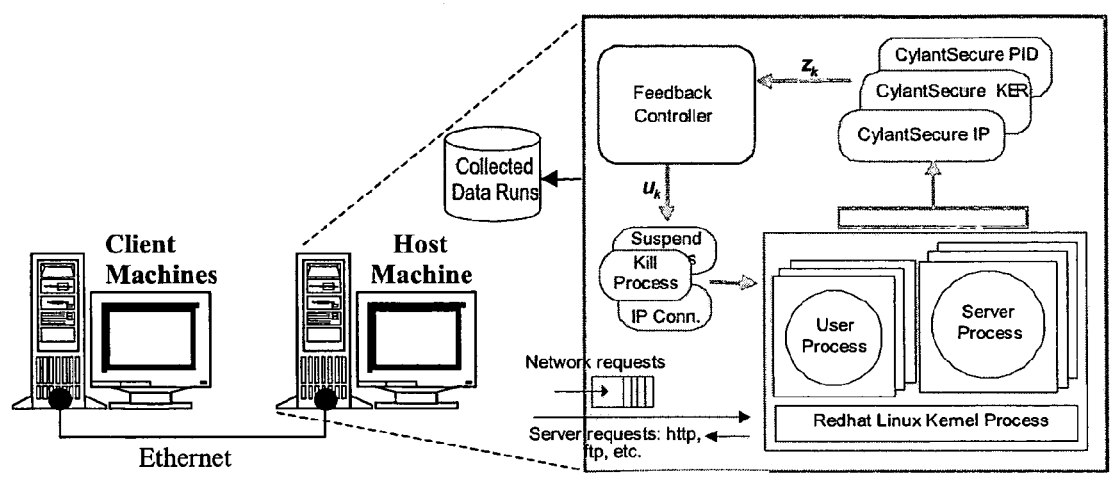
FIG. 3 demonstrates one exemplary embodiment for the disclosed methods and systems relative to a host system under attack.

In one exemplary embodiment, the disclosed methods and systems employ a controller as provided herein for a prototype host-based ADS intended to protect a Linux-based web server from automated Internet worm attacks. Automatic response is desired because the attack phases of (i) vulnerability identification and exploitation, (ii) local damage infliction, and (iii) subsequent transformation of the host into an attacker, evolve at machine speed, making it impractical for manual intervention to detect the attack and prevent the worm from spreading. FIG. 3 illustrates the overall laboratory setup and the basic integration architecture for the security assets composing the prototype ADS, namely the sensors, the actuators and the model-based feedback controller.

In an exemplary scenario, there can be one host system, referred to in this embodiment as a protected web server or "server," and other systems that can be referred to as clients. The clients can generate communications/network traffic via random page requests to the server/host system. On the server, normal user session and cgi-script activity can be generated, for example, through a number of Bourne Shell, Perl and Expect scripts executing Unix commands. In the exemplary embodiment, both the web traffic and the local user sessions on the server can be set to "low," "medium," and "high" activity levels.

A client can also, at any time, initiate an Internet worm attack. For one embodiment, a Ramen worm can be employed to provide a cataloged attack that exploits vulnerabilities present in relatively recent Linux distributions, although those of ordinary skill will recognize that such example is provided for illustration and not limitation. Though the experiments involve a specific Internet worm, the goal is to develop the prototype ADS to recognize a broader class of Internet worm attacks. Table I provides an Internet worm's generic steps grouped into separate phases according to the sub-objectives of an attack sequence. The typical characteristics of an Internet worm attack include: port scanning and probing to identify potential victim systems and specific vulnerabilities present on those systems, user-to-root access exploitation, downloading and installing an attack payload and, ultimately, conversion of the victim into a new attacker. Some candidate countermeasures are common to each of these steps, though specifics (e.g., which attack process to kill) may differ based on the embodiment.

In the exemplary embodiment, six main variations of a malicious worm were employed to attack the victim. Random delays can also be used to vary the timing between key attack steps. Variations on the attack are useful to determine the extent to which the prototype ADS, whose underlying feedback controller is trained using a particular instance of the worm attack, can defend against attacks that are distinct from that used in the training set.

In the exemplary embodiment, the sensors on the host system are software-based anomaly detectors, such as those that may be part of the commercially-available CylantSecure system developed by Software Systems International. Such sensors can include, for example, a specially instrumented Linux kernel that includes software probes that can collect data about the behavior of the host system. In an embodiment, this behavior data can be considered in three categories: probes associated with process activity (PID), network activity (IP), and general kernel activity (KER). It can be recognized that the number of categories of behavior data can vary based on the embodiment.

During online operation, these data streams can be sent to a "Watcher" process that can compare streams of incoming execution profiles with a normal profile (generated during a calibration phase) to produce numerical distance measurements quantifying the measured level of anomalous kernel behavior. Note that for the present embodiment, the three streams provide a distance value per report, but the PID stream also includes context about the associated process, and the IP stream includes context about the associated network connection. The rate of sensor reports during normal operation can be understood to be directly dependent on the amount of kernel activity.

The exemplary embodiment also includes three different actuators corresponding to a set of responses to potentially counter and/or recover from a generic worm attack, although in other embodiments, other numbers of actuators can be used. The first actuator can correspond to a default response and can be purely passive in that it influences only the way a future observation is generated, and offers no potential to modify the evolution of an actual attack. An actuator that can kill a process has potential to counter the worm during its first two phases, provided the correct process is identified and killed in a timely manner. Generally, targeting a non-attack process degrades quality-of-service and is assumed undesirable. By the time the worm has entered its third and final phase, attack objectives are no longer effectively countered by simply killing processes, and a more elaborate recovery mechanism is generally required. This recovery mechanism is assumed to severely disrupt the normal operation of the host and is considered an appropriate response only after the attack enters its third phase. Generally, the less drastic kill-process actuator is appropriately applied in the earlier phases so that the recover action need not be utilized. For the purposes of the exemplary embodiment, as provided herein, the default, kill-process, and recovery actuators can be represented by the following brief notation, respectively: DFLT, KILL, and RCVR.

Note that a feedback controller relying on a PO-MDP model and policy as provided herein to perform the recursive estimation and response selection calculations, can be implemented as a separate software process on the host system, although other variations are contemplated within the scope of the disclosed methods and systems. The PO-MDP model can serially receive, via a shared-memory interface, measurements generated by the sensors. To fit the PO-MDP formulation, a mapping from this time-stamped sequence of real-valued distances to a discrete-time sequence of single-stage observations is specified. In the exemplary embodiment, the default actuator, DFLT, represents this repeated activity of processing incoming measurements for the next decision stage. DFLT can thus be understood to be a "wait-and-see" action parameterized by a staging scheme or rule by which the next decision stage is generated, and a detection scheme, or rule by which multiple real-valued measurements received within a stage get mapped to and/or otherwise associated with a finite observation space.

For the exemplary embodiment, the disclosed methods and systems were restricted to a staging and detection scheme that independently considers the three data streams, KER, PID and IP, in a similar manner, although variations of such considerations are within the scope of the disclosed methods and systems. Consider the staging scheme per stream l can be parameterized by an interval of time between estimator updates, or the update period $\tau_l$, coupled with how distance values received in a single period are reduced to a single value, or the aggregation rule $\rho_l$. Fixing a staging scheme $\tau_l$, $\rho_l$, the disclosed embodiments can employ Bayesian methods to optimize a detection scheme, although other methods can be used. One form of the optimal detector is a decision rule $\delta$ that partitions an infinite measurement space into r disjoint decision regions, each region corresponding to one of a finite number r possible output observations.

For simplicity, the exemplary embodiment can assume a binary detector output, e.g., r=2, per measurement stream l, with each stream's decision rule parameterized by a single threshold value $\gamma$. That is, given a single-stage measurement $D_0 \in \Re$ on stream l, we consider decision rules $\delta : \Re \to \{0,1\}$ of the form:

$$\delta(D_0) = \begin{cases} 0, D_0 \leq \gamma_l \\ 1, D_0 > \gamma_l \end{cases} \quad (8)$$

where output "0" denotes the safe observation and "1" the alert observation. Note that the true state from which one measurement is produced is one of the n components of the state space S. Viewing any $D_0$ as a realization of random variable D, optimal threshold selection depends on (i) n measurement distributions $Pr(D|x_k)$ that can be extracted from collected data, (ii) a prior probability distribution $Pr(x_k)$ obtained via a combination of assumptions and data and (iii) a detector cost function, where C: $\{0,1\} \times S \to \Re$ represents the relative undesirability associated with detector output $Y_0 \in \{0,1\}$ when $i \in S$ is the true state. For any fixed threshold $\gamma_l$, its expected detection cost is then defined by:

$$J(\gamma) = \sum_{i=1}^{n} Pr(x_k = i)[C(0, i)Pr(D \leq \gamma | x_k = i) + C(1, i)Pr(D < \gamma | x_k = i)] \quad (9)$$

Accordingly, within the specific class of binary decision rules described by (8), the optimal threshold $\gamma^*_l$ minimizes (9). Given collected data and the prior probability distributions and detector cost functions, applying (8) and (9) reduces the detection scheme parameterization to of three binary thresholds, $\gamma^*_{PID}$, $\gamma^*_{KER}$, and $\gamma^*_{IP}$, that correspond to the sensor data streams provided previously herein in the exemplary embodiment.

The illustrated kill-process actuator, KILL, extends the DFLT parameterization with a parameter that also specifies a targeting scheme $\sigma_{PID}$ to be employed based on the context provided by the PID stream. Accordingly, the KILL actuator maintains a table of processes associated with anomalous PID reports, or PID reports with distance values above a specified value $\delta_{PID}$, and, upon command from the controller, employs the targeting scheme and/or rule to select the process to be killed. For example, the actuator can note the time associated with each anomalous PID report and then target the process reported most recently, denoted by $\sigma_{PID}$=RCNT. Alternatively, the actuator can keep a running average of anomalous distances reported per process and then target the process with highest average distance, denoted by $\sigma_{PID}$=DIST.

The recovery actuator, RCVR, can indicate to the security administrator that manual intervention is desired and can halt, pre-empt, and/or otherwise interrupt the host system to deny further propagation of the worm to other vulnerable hosts.

In the exemplary embodiment, the prototype ADS can log three types of events to support offline model/strategy development for the controller and subsequent online validation. Generally, sensor events can be understood to correspond to the measurement reports sent to the controller by the KER, PID and IP sensor streams. Response events correspond to the commands sent by the controller to the three available actuators: (i) the passive DFLT actuator parameterized by per-stream staging schemes $\tau_l$, $\rho_l$ and detection schemes $\gamma^*_l$; (ii) the active KILL actuator further parameterized by targeting scheme $\sigma_{PID}$ and anomalous-process indicator $\delta_{PID}$; and, (iii) the passive RCVR actuator.

Truth events can correspond to special markers that reveal the true state trajectory (i.e., the true activity of the remote client machines and the attacker) and can be inserted strictly for offline model development and experimental evaluation. Truth events allow sensor events to be associated with a particular state/control pair of a PO-MDP model, which facilitates the extraction of probability parameters from a collected data set during offline controller design. Furthermore, for any single data run during online controller experimentation, knowledge of the true state trajectory can be used to compute the associated evaluation metrics defined by (4) and (5).

Messages marking truth events can be transmitted to the controller by load generation utilities on the client machines, from which the actual loading condition placed on the web server/host system can be derived, and by a specially instrumented attack script to indicate the beginning and ending of attack steps. In the exemplary embodiment, these two categories of truth events can be denoted by NRML and ATCK, respectively.

While the controller can reliably mark the initiation of a response, note that truth events reliably marking the actual outcome of an active response (e.g., whether a KILL response has thwarted the attack) can require further instrumentation of the attack script or perhaps special messages from the actuators themselves.

Table II includes parameterizations assumed for the key event types in the exemplary embodiment. During operation, sensor and response events can be directly observable by the decision-making components of the feedback controller, whereas truth events, which would not be present except during experimentation, are assumed completely unobservable.

Accordingly, a "design mode" of the exemplary embodiment can facilitate data collection to provide a training set from which empirical development of a PO-MDP model, including binary threshold selections, can be based. The particular control strategy is not relevant during training set generation; rather, it is controlled in the sense of producing an adequate number of samples under loading conditions and instrumented attack steps as well as active actuation. For each loading condition, a training set includes at least one extended run of normal operation (e.g., for the exemplary embodiment, on the order of twenty minutes) and many repeated runs of attack operation (e.g., for the exemplary embodiment, on the order of several minutes, with the first two phases occurring within tens of seconds). In the attack runs, the attack can start randomly relative to an underlying normal operation.

An "experimentation mode" of the exemplary embodiment can be performed after an operational model and strategy are available, whereupon data collection during the experimentation mode can facilitate controller evaluation, and specifically, the two decision-making components of the stationary PO-MDP formulation provided herein: (i) the recursive estimator driven by the statistical system and observation models, F and H, respectively; and, (ii) the response selector driven by its response policy, μ. For the exemplary embodiment, the training set from which the PO-MDP model is empirically developed concerns only the "low" workload condition on the web-server/host system and, during attack operation, the worm variant. The resulting controller can be shown to achieve sub-second response, successfully diagnosing the attack's key stages and, most importantly, preventing the host system from being transformed into an attacker that could further propagate the worm. This is accomplished even for a variant of the worm not appearing in the training set.

Establishing the structure of the PO-MDP model includes specifying the state space S of dimension n, the control space C of dimension m, and the observation space Z of dimension q. Further, the $mn^2$ state transition probabilities $Pr(x_{k+1}|x_k, u_k)$, and the mnq sensor observation probabilities $Pr(z_k|x_k, u_{k-1})$ are specified via a combination of engineering assumptions and empirical approximation from a training set of collected data. Thereafter, based on assumptions that the statistical models are at least partially controllable and observable, the mn expected cost-to-go values can be populated to compose a response policy μ via numerical optimization, given F and H as well as the $mn^2$ state transition costs $c(x_k, u_k, x_{k+1})$ provided by a cost function G.

Referring now to the structural specification of the PO-MDP, in computer security embodiments, S can be selected to abstract the security environment, the modes of anticipated normal activity, and the steps of anticipated attack activity, at a level of detail consistent with the capabilities of the available security assets. If the "low," "medium" and "high" server workload conditions are denoted by L, M, and H, respectively, as the normal modes of operation, the attack steps can start as fine-grained as the ATCK event markers injected into the collected data by the instrumented attack script. With reference to Table I, the first two phases (e.g., "Phase 1" and "Phase 2," Table I) of the attack states can be denoted by states $A_1, A_2, \ldots, A_4$, the final phase of the attack (e.g., "Phase 3," Table I) can be denoted by F, and, the absence of all attack activity by state N.

More specifically, and with continuing references to the steps of an automated attack as provided in Table I, assuming a constant workload, a transition from N to $A_1$ corresponds to the beginning of the "scan" step that can be understood to initiate Phase 1 of an automated attack based on Table I. A transition from $A_1$ to $A_2$ corresponds to the beginning of the access control "bypass" step (e.g., step 2, Table I). Simultaneously ending the first phase of the attack and beginning Phase 2, a transition from $A_2$ to $A_3$ corresponds to the first command executed from the successfully attained user shell, typically initiating the "download" of the payload to the victim, provided previously herein as the "host system" or "web server." A transition from $A_3$ to $A_4$ corresponds to the "installation" of the payload on the victim. Finally, a transition from $A_4$ to F corresponds to the security failure, entering the final phase or Phase 3 of an attack according to Table I, at which time the victim/host system begins to attack other vulnerable machines to propagate the worm. Accordingly, recognizing that an attack can occur regardless of the current server workload, a state space can be selected as $S=\{L, M, H\} \times \{N, A_1, \ldots, A_4, F\}$, or n=18.

It can be understood in the exemplary embodiment that different actuator parameterizations may generally provide different per-stage transition/observation probabilities and maintenance costs. Accordingly, two passive controls denoted by $W_N$ and $W_A$ can have nominal and alternative parameterizations, respectively, for the DFLT actuator. Both passive controls can utilize the same staging scheme for the three measurement streams, which in one embodiment can include an update period of 0.2 sec and an aggregation rule that averages raw distances received within a single period, or, the following condition can be established:

$$(\tau_{KER}, \rho_{KER}) = (\tau_{PID}, \rho_{PID}) = (\tau_{IP}, \rho_{IP}) = (0.2, \text{AVG}) \qquad (9)$$

Both of these controls employ the same detector cost function that expresses a minimum probability-of-error criterion where errors correspond to outputting "alerts" while in state N or "safes" when not in state N:

$$C(Y_o) = \begin{cases} 5, & y=1, i=N \\ 1, & y=0, x \in \{A_1, \ldots, A_4, F\} \\ 0, & \text{otherwise} \end{cases} \qquad (10)$$

Control $W_N$ optimizes the thresholds assuming an equally-likely prior probability distribution, while $W_A$ biases the priors associated with the intermediate attack states to be proportional to the number of measurement samples in the training set associated with that state. Accordingly, such bias can represent the relative duration of the intermediate states of the worm variant used to generate the training set.

If a control K can be tied to the active KILL actuator, and utilizing the same staging and detection schemes as for $W_A$ and a targeting scheme against the most recent anomalous process reported on the PID stream, or $(\rho_{PID}, \epsilon_{PID})=(\text{RCNT}, 10^{-10})$, control R also shares the same staging and detection scheme as $W_A$, but represents the initiation of the RCVR actuator, which is the purely passive indicator of a detected failure. Accordingly, we choose a control space $C=\{W_N, W_A, K, R\}$, and thus m=4 for this exemplary embodiment.

Choosing a finite observation space Z should reflect the three measurement streams, KER, PID and IP, that output a real-valued "distance" per measurement, coupled with the detection schemes employed for all controls. Assuming a binary detection scheme applied to each stream independently, the KER stream can be either below or above its threshold, denoted by KER:0 and KER:1, respectively. Similarly, the thresholded PID stream produces two possible values, PID:0 and PID:1, and the thresholded IP stream produces two possible values, IP:0 and IP:1. Accordingly, Z={KER:0, KER:1, PID:0, PID:1, IP:0, IP:1}, and thus q=6 for thi exemplary embodiment.

Given the structural specification of a PO-MDP, as provided herein, the second step is to determine numerical values for the per-stream, control-dependent measurement distributions $Pr(D|x_k, u_{k-1})$ (so that control-dependent sensor thresholds can be optimized) and the state transition probabilities $Pr(x_{k+1}|x_k, u_k)$ and sensor observation probabilities $Pr(z_k|x_k, u_{k-1})$ Theoretically, these conditional probabilities are interpreted as the relative frequency, over an infinite number of trials, of random events given state/control pairs defined by the state and control spaces S and C. Practically, many of the transition probabilities and all of the measurement distributions and observation probabilities can be empirically approximated from the training set. For each state/control pair, the more samples present in the training set, the more likely the empirical approximation satisfies the theoretical interpretation. Given a training set, empirically approximating the probability distributions can be performed by counting the number of occurrences of events represented by each conditional distribution.

Figure 4A:
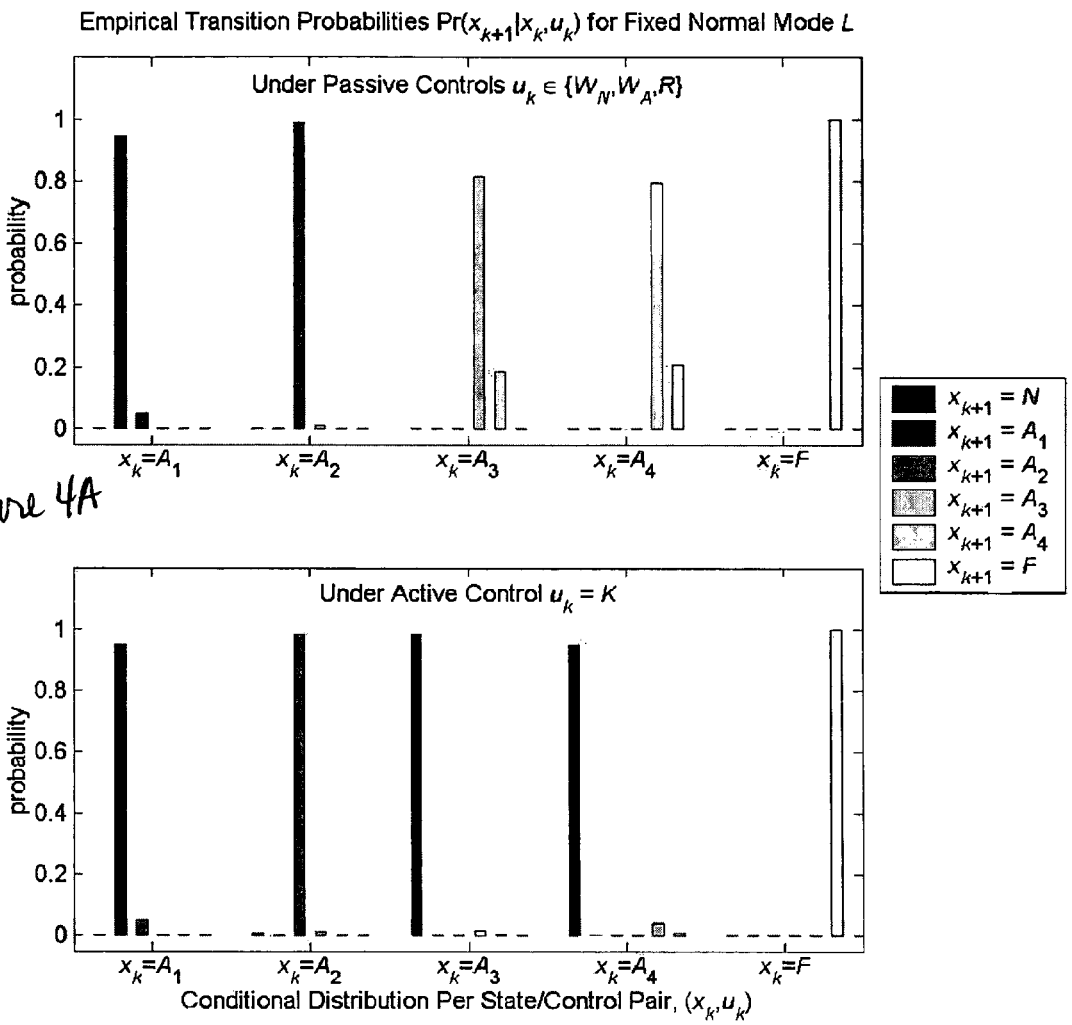
Figure 5A:
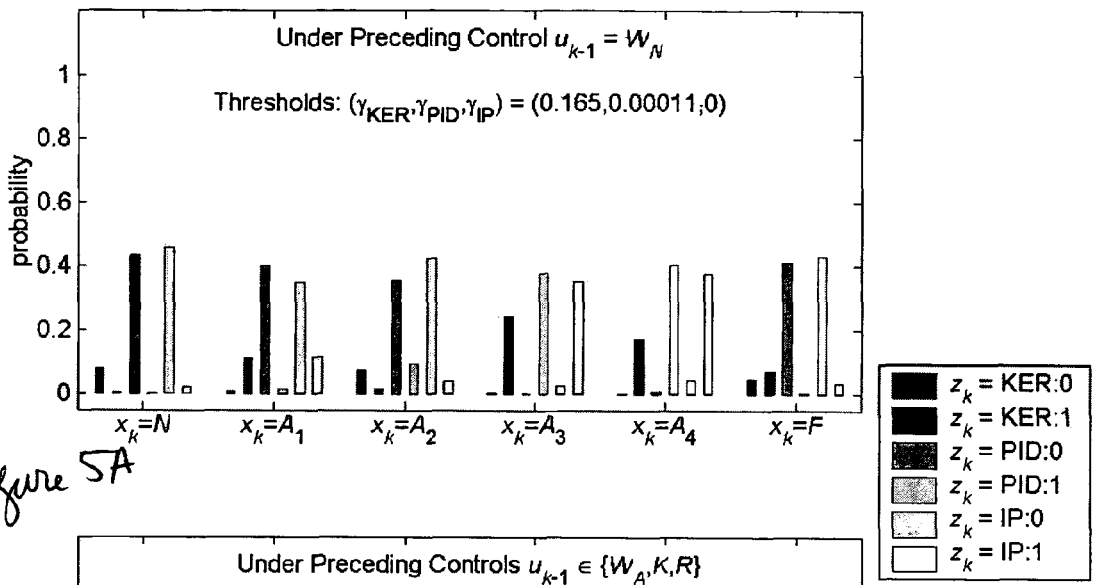
FIGS. 5A and 5B represent exemplary observation models for an exemplary embodiment according to FIG. 3.
Figure 5B:
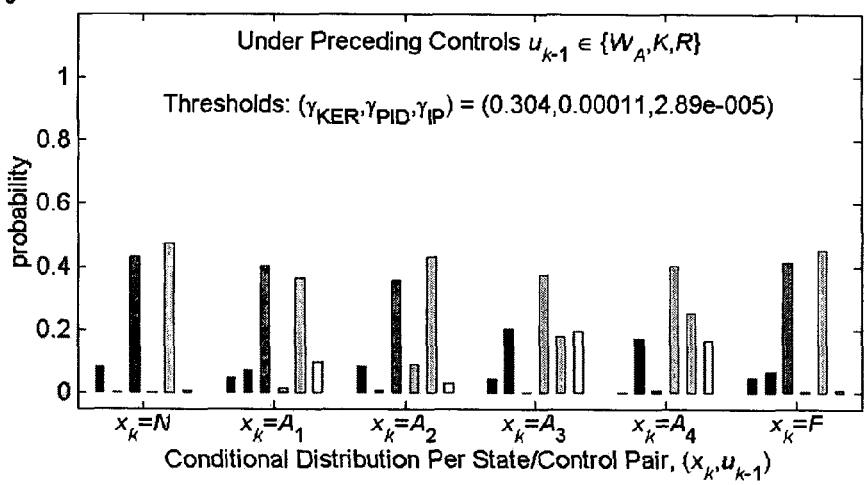

Recall that the training set concerns only the "low" workload condition on the web-server; thus, during normal operation, state (L,N) is the only state encountered. Accordingly, for this embodiment, during attack operation, the five states $Lx\{A_1, A_2, A_3, A_4, F\}$ are all sampled and, under passive controls $W_N$, $W_A$ and R, the only potentially nonzero transition probabilities are for self-transitions in all states and transitions between successive steps of the automated worm attack, remaining in state (L,F) indefinitely upon completion of the attack. Under active control K, the other potentially nonzero transition probabilities are for transitions from $Lx\{A_1, A_2, A_3, A_4, F\}$ back to state (L,N). FIG. 4 shows the state transition probabilities empirically obtained from the available training set, concerning an exemplary attack variant. The nonzero probabilities of transitioning from states $Lx\{A_2, A_3, A_4\}$ back to state (L,N) for active control K imply at least a partially controllable model F. FIG. 5 shows the empirical results of applying (8)-(10) to derive the binary thresholds per measurement stream using the available training set. Because the distributions differ noticeably across the states $Lx\{A_1, A_2, A_3, A_4, F\}$, we can conclude to have at least a partially observable model H.

The only statistics that cannot be reliably approximated from training data correspond to the transition from the absence of an attack, or state (L,N), to initiation of the attack; therefore the conditional distribution $Pr(x_{k+1}|x_k=(L,N), u_k)$ can be specified using engineering assumptions that reflect a "best guess" as to the likelihood of experiencing an attack. Letting parameter $p_A$ represent the per-stage likelihood of being attacked and assuming a fixed "low" workload and the class of automated worm-like attacks, we select $$Pr(x_{k+1} | x_k = (L, N), u_k) = \begin{cases} 1 - p_A, & x_{k+1} = (L, N) \\ p_A, & x_{k+1} = (L, A_1) \\ 0, & \text{otherwise} \end{cases} \quad (11)$$

During operation, the numerical value assigned to probability $p_A$ directly impacts the readiness of the estimator to infer the presence of attack activity based on sensor alerts. Overall, the more observable attack activity is by the sensors, the less dependent controller performance becomes on the assigned numerical value for the typically unknown parameter $p_A$.

Ideally, given system model F and observation model H, expressing the cost function G allows a dynamic programming technique, for example, to automatically generate the optimal response policy. Beyond the interpretation of cost to the administrator, the absolute values are not critical because the form of the response policy recognizes cost tradeoffs based only on the relative values. Practically, however, the complexity associated with its exact solution is prohibitive and approximation methods, and therefore, a heuristic response policy is employed whose numerical parameters are manually selected prior to controller operation. In this case, the cost function G is relevant for computing the primary evaluation metric in (5) for any data run during experimentation.

Our response policy assumes the appropriate control is $W_N$ when the process is truly in state N. At the other extreme, when in state F, the policy assumes the appropriate control is R. During the intermediate attack states, let $W_A$ be an appropriate control when truly in state $A_1$ and K be the appropriate control when in any one of the partially-controllable states, $A_2$, $A_3$, or $A_4$. Recall that the execution of active control K depends on the KILL actuator being aware of at least one anomalous process that can be targeted; if no such process is available, the control defaults to $W_A$. A cost function G that reflects these assumptions is populated by transition costs:

$$c(x_k, u_k, x_{k+1}) = \begin{cases} c_1, & x_k \in \{A_1, A_2\} \text{ and } u_k = W_N \\ c_2, & x_k \in \{A_3, A_4\} \text{ and } u_k \in \{W_N, W_A\} \\ c_3, & (x_k = F \text{ and } u_k = R) \text{ or } (x_k \neq F \text{ and } u_k = R) \\ c_x, & x_k \in \{N, A_1\} \text{ and } u_k = K \\ c_k, & x_k \in \{A_2, A_3, A_4\} \text{ and } u_k = K \\ 0, & \text{otherwise} \end{cases} \quad (12)$$

where: (i) parameters $c_1$ and $c_2$ reflect the "failure" cost associated with allowing a single stage of the first and second phases, respectively, of the attack to proceed without selecting appropriate control; (ii) parameter $c_3$ reflects the "failure" cost and equivalent "maintenance" cost associated with inappropriate non-selection and selection, respectively, of passive control R; and, (iii) parameters $c_x$ and $c_k$ reflect the "maintenance" cost associated with the inappropriate and appropriate selection, respectively, of active control K.

We consider the intuitive class of policies μ that select out of the m=4 candidate controls based on three independently selected sensitivity parameters, $\eta_A$, $\eta_K$, $\eta_R \in (0,1)$, applied to the components of the probabilistic state estimate. More specifically, apply control $W_N$ as long as the estimator's confidence in state N exceeds probability $1-\eta_A$; considering the confidence in state $A_1$ relative to the total confidence in all other attack states, apply control $W_A$ provided this relative confidence exceeds probability $1-\eta_K$; considering the total confidence in controllable states $A_2$, $A_3$, or $A_4$ relative to the confidence in state F, apply control K provided this relative confidence exceeds probability $1-\eta_R$; otherwise, apply control R. Mathematically, based on the n=6 components of the probabilistic state $B_k$ and the three sensitivity parameters ($\eta_A$, $\eta_K$, $\eta_R$), this heuristic policy is expressed by:

$$(\mu, Bk) = \begin{cases} W_N, & \eta_A \le [B_k]_1 \le 1 \\ W_A, & [B_k]_1 < \eta_A \text{ and } \eta_K \le [B_k]_2/(1-[B_k]_1) \le 1 \\ K, & [B_k]_2/(1-[B_k]_1) < \eta_K \text{ and } \eta_R \le b_K/[B_k]_6 \\ R, & \text{otherwise} \end{cases} \quad (13)$$

where $b_K = [B_k]_3 + [B_k]_4 + [B_k]_5$ represents the total estimator confidence in any one of the partially-controllable states. Note that a lower numerical value for a sensitivity parameter implies the estimator's confidence must exceed a higher probability threshold before the corresponding control is selected, and thus accordingly, for the exemplary configuration, a lower sensitivity implies a less likely control.

Given the statistical models depicted in FIGS. 4 and 5 and the policy of the form expressed in (13), the prototype ADS was operated in a web-server environment. In the data runs provided herein, the normal workload generated on the server was fixed at a "low" configuration, matching the training set from which the PO-MDP model was derived; however, as provided herein, employed was a worm variant distinct from an attack contained in the training set.

For the exemplary embodiment, a numerical value of $p_A = 10^{-6}$ was assigned to the unknown probability of being attacked and the inputs to the recursive estimator were initialized to $u_{-1} = W_N$ and $B_{-1} = [1-p_A \; p_A \; 0 \; 0 \; 0 \; 0]'$. So that the average cost per stage can be computed for each run, the following numerical values were assigned to the cost parameters listed in (12): $c_1 = 10$, $c_2 = 100$, $c_3 = 1000$, $c_x = 50$, and $c_k = 20$.

Figure 6:
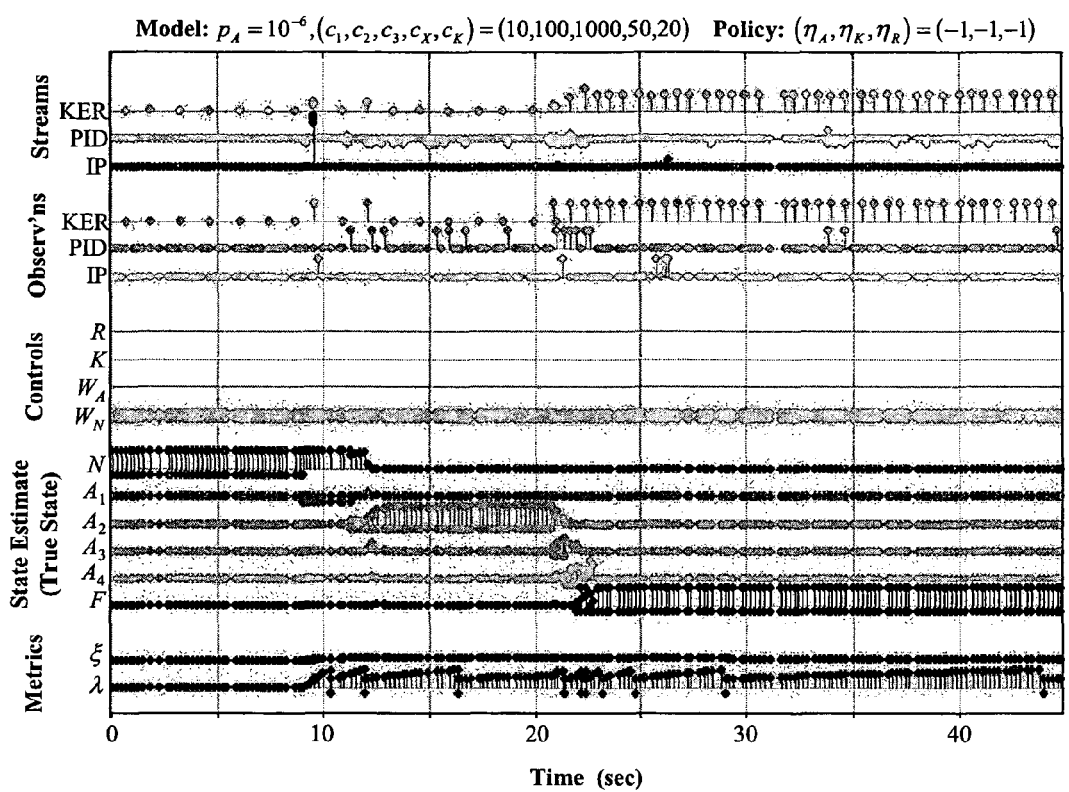
FIG. 6 provides exemplary data for one embodiment of the disclosed methods and systems using a feedback controller with an uncontrolled policy.

FIG. 6 shows a total of eighteen separate time-tagged data series related to a single ADS experiment, where the origin on the time axis is sufficiently after the fading of any start-up transients in emulating normal web traffic and user sessions on the laboratory network. The vertical scale of each time series, though not explicitly labeled, is from zero to one. Most of these time series represent the inputs and outputs of the controller process, but some also represent unobservable information to support experimental evaluation.

With continued reference to FIG. 6, the top three time series, labeled streams, are the raw, nonnegative distance values reported by the streams. Most of these distances may occasionally be below unity, but occasionally a distance report can overlap with a neighboring time series (e.g., the IP distance approximately nine seconds into the data run). The occasional negative-valued stem along the PID stream indicates that an anomalous process, whose distance exceeded the value of $\epsilon_{PID}$, was added to the list of potential target processes maintained by the KILL actuator. The next three series, labeled "Observations," are the inputs to the recursive estimator and correspond to the finite-valued sequence generated from the real-valued measurement sequence via the staging and detection schemes. The next four time series, labeled "Controls," represent the output of the response selector which, under the "uncontrolled" policy, is fixed at $W_N$. The next six time series, labeled "State Estimate," represent the nonnegative-valued components of the probabilistic state vector in each decision stage.

Though not observable by either decision-making component of the controller, the negative-valued stems in the estimate output indicate the true state trajectory. For example, in FIG. 6, the process begins in state N and the attack initiates after approximately nine seconds of normal operation, indicated by the negative-valued stems in the time series for the first attack state $A_1$. For the exemplary embodiment, attack state $A_2$ begins approximately two seconds later, state $A_3$ approximately ten seconds later, etc. The final two time series, labeled "Metrics," represent the empirical evaluation of the average error per stage $\xi$ and average cost per stage $\lambda$ defined in (4) and (5), respectively. With reference to FIG. 6, the estimator diagnoses most of the key stages of the attack, and therefore $\xi$ remains relatively low; however, because of the absence of control, the attack proceeds to completion and large "failure" costs accrue. For the assigned numerical cost values, note that $\lambda$ can exceed a value of unity. The negative-valued stems on the time series for $\lambda$ represent a doubling of the vertical scaling; thus, the saw-tooth nature of this time series in FIG. 6, coupled with negative-valued stems, represents monotonically increasing cost.

Figure 7A:
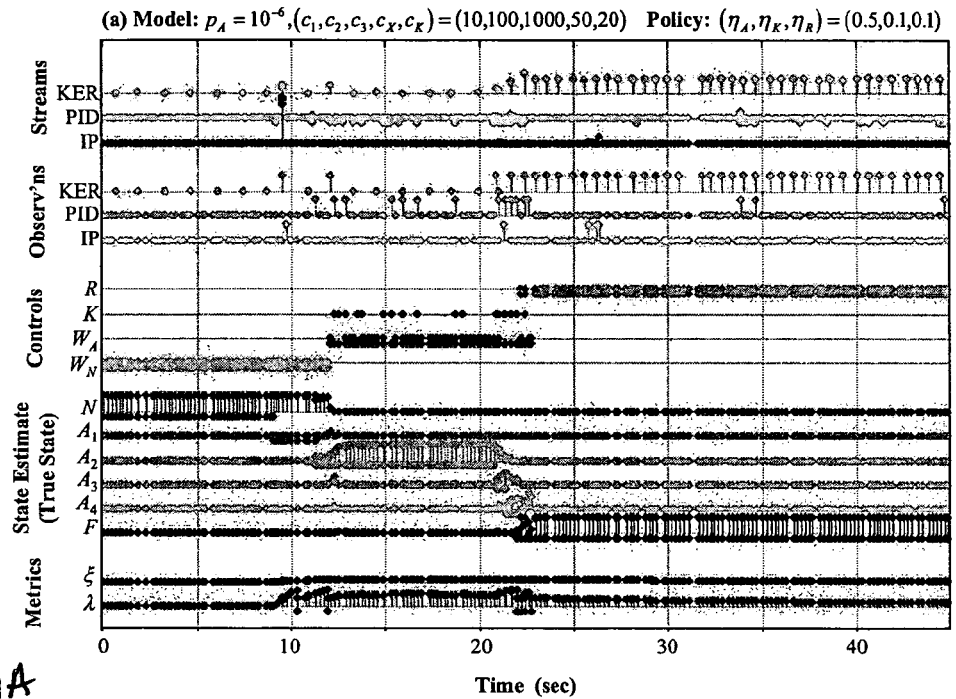
FIGS. 7A and 7B include exemplary data for one embodiment of the disclosed methods and systems using a feedback controller and a "heuristic" policy with actuation disabled and enabled, respectively, for a first shell exploit.

FIG. 7(a) depicts controller operation under a "heuristic" policy parameterized by sensitivity values ($\eta_A$, $\eta_K$, $\eta_R$) = (0.5, 0.1, 0.1), for the same sensor input as shown in FIG. 6. Accordingly, the controller operates on previously logged data originally generated under an "uncontrolled" policy and, thus, actuation of a selected active control can have no effect. While FIG. 7(a) indicates where active control K would have been selected under the "heuristic" policy, the true response as far as future decision-making is concerned is K's passive counterpart, control $W_A$. The negative-valued stems on the time series labeled "Controls" convey this notion, and thus, when considering historical data with a control policy that differs from the policy used during the initial generation of the data, a distinction between selected responses and actuated responses exists for active controls. The negative-valued stems correspond to the actuated responses recorded during live operation. Note that the distinction does not arise with purely passive controls.

Comparison between FIGS. 6 and 7(a) illustrates the potential that the ADS provides for improving host survivability. Not only can ADS initiate kills in the appropriate steps of the attack, but ADS can also timely diagnose the costly state F as indicated by the selection of control R only a few seconds upon compromise. This could prevent the compromised host from further propagating the worm to other vulnerable hosts. Based on the cost function, these benefits are quantified by the reduced average cost per stage, or metric $\lambda$, in FIG. 7(a) compared to FIG. 6.

Figure 7B:
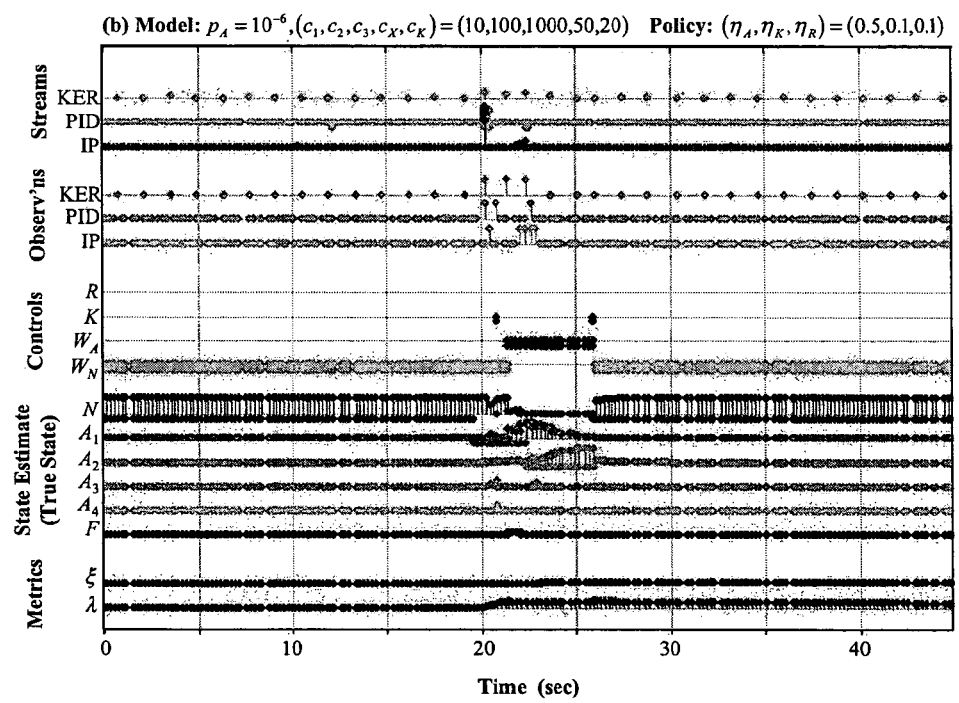

FIG. 7(b) shows the output of a live data run where actuation is enabled, using the same policy as used in FIG. 7(a). The ADS successfully thwarts the attack before it completes the bypass and gains a privileged shell. In this particular data run, note that it also prematurely applied control K and mistakenly targeted a friendly process while that attack was still in the scan state, $A_1$. It was the unusual density of sensor alerts while in state $A_1$ that misled the controller, but the controller subsequently thwarts the attack and correctly recognizes the return of normal operation. With continued reference and comparison to FIGS. 6 and 7(a), FIG. 7(b) shows a significantly lower evaluation of the cost metric.

FIGS. 8(a) and 8(b) are the analogous illustrations as FIGS. 7(a) and 7(b), except that the attack uses a second exploit that included a variant of the worm not present in the training set. Comparison of FIGS. 7(a) and 8(a) demonstrate the difference between the two attack variants. The worm using the first shell exploit (e.g., FIGS. 7(a) and (b)) exhibits a comparatively shorter bypass step, or time spent in state $A_2$, but comparatively longer download and install steps as conveyed by time spent in states $A_3$ and $A_4$, respectively. Also, the density of anomalous process activity as reported by the PID stream appears to be lower for the second shell exploit rather than the first shell exploit. Though FIG. 8(a) shows degraded attack step diagnosis and a corresponding increase in the error metric ξ, the controller still initiates kills in the appropriate states and quickly indicates the state of failure with control R. FIG. 8(b) shows the output for a live data run of the second attack variant, with the controller killing the fraudulently obtained shell privilege immediately upon completion of the bypass.

FIGS. 7 and 8 illustrate how an ADS driven by a feedback controller as provided herein, can reduce the "failure" cost incurred by thwarting attack objectives in substantial real-time. Feedback control can also benefit limitations identified with ad-hoc response schemes. Automated response based on static rules that typically consider single alerts at a time, especially when considering anomaly detectors, can have undesirable rates of false alarms, thus leading to costly over-application of security-related defenses.

In one embodiment, a rule-based controller can be assumed, where the rule-based controller can be equipped with the same sensor and actuators as the feedback controller; however, the rule-based controller does not use the PO-MDP model to make decisions, but rather ignores uncertainties associated with the sensor alerts and the outcome of the active controls. The exemplary rule-based controller thus can employ the following rules: (i) every sensor alert toggles the confidence from being in state N to being under attack; (ii) while confident of being under attack, the application of active control K toggles the confidence back to being in state N; and, (iii) while confident of being under attack, if the PID stream has not yet identified an anomalous process to be targeted, passive control WA is applied until an anomalous process is identified.

Figure 9A:
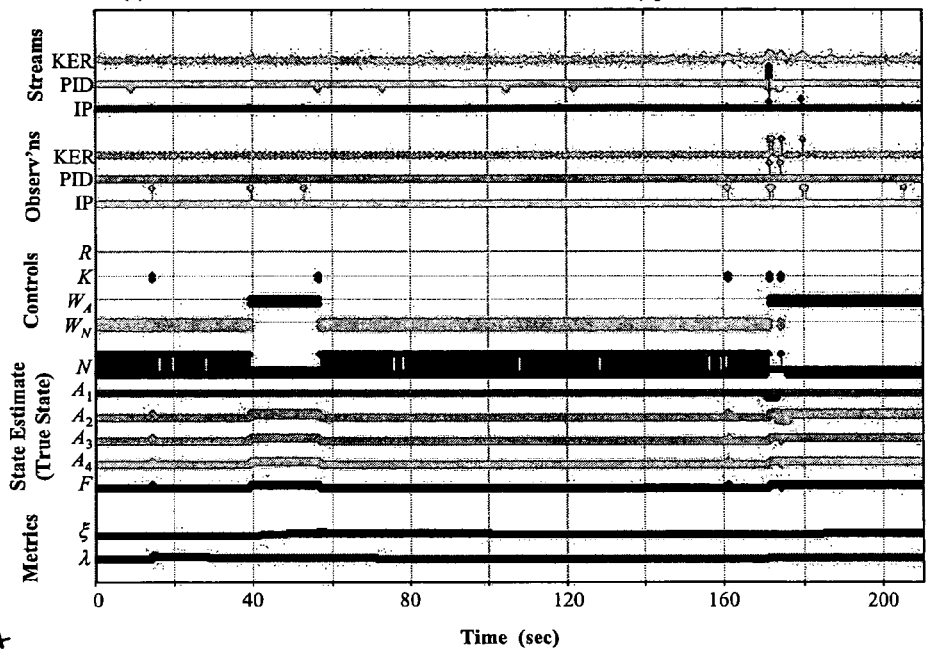
Figure 9B:
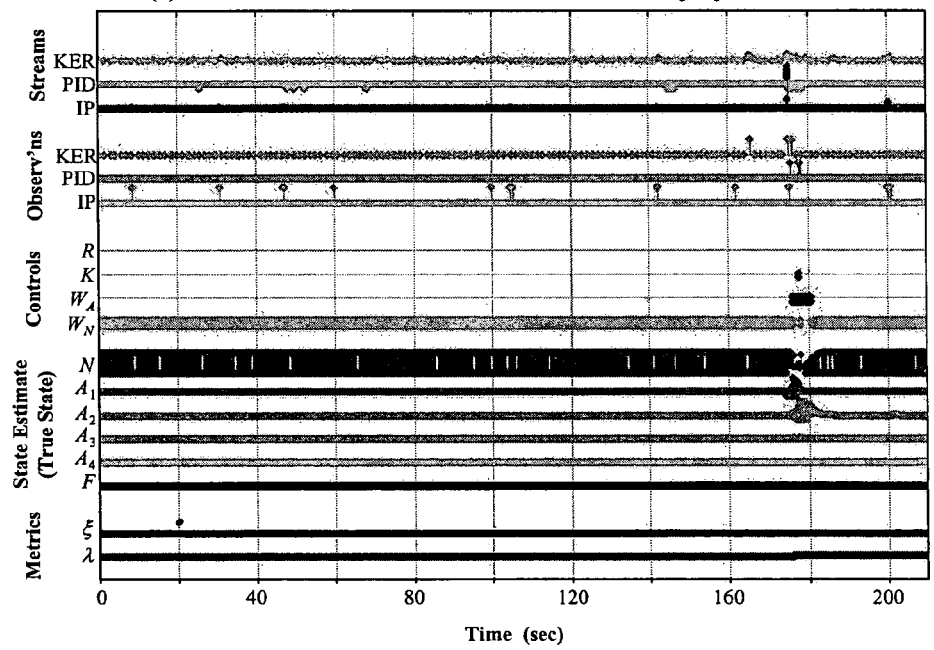

FIGS. 9(a) and 9(b) represent outputs of the rule-based controller and feedback controller, respectively, during an extended period of normal operation that is followed by an attack. While both controllers successfully thwart the attack, during the three minutes of normal operation that preceded the attack, the rule-based controller targets a friendly process on three separate occasions, while the feedback controller successfully rejects all of the false alarms. The feedback controller reduces the rate of inappropriately applied response, resulting in a reduced "maintenance" cost.

What has thus been described are methods and systems for controlling at least a part of a microprocessor system, that include, based at least in part on objectives of at least one electronic attack, using a partially observable Markov decision process (PO-MDP) to provide a model of at least part of the microprocessor system, the PO-MDP including a controller, the controller including an estimation policy to recursively generate a state estimate at stage k based on a state estimate at stage k−1, a control at stage k−1, and an observation at stage k, and, a response policy to select a control at stage k based on the state estimate at stage k, and cause the selected control to be provided to at least a part of the microprocessor system.

The methods and systems described herein are not limited to a particular hardware or software configuration, and may find applicability in many computing or processing environments. The methods and systems can be implemented in hardware or software, or a combination of hardware and software. The methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) can thus be embedded in one or more devices that can be operated independently or together in a networked environment, where the network can include, for example, a Local Area Network (LAN), wide area network (WAN), and/or can include an intranet and/or the internet and/or another network. The network(s) can be wired or wireless or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices, and the processor instructions can be divided amongst such single or multiple processor/devices.

The device(s) or computer systems that integrate with the processor(s) can include, for example, a personal computer(s), workstation (e.g., Sun, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a microprocessor" and "a processor", or "the microprocessor" and "the processor," can be understood to include one or more microprocessors that can communicate in a stand-alone and/or a distributed environment(s), and can thus can be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, can include one or more intranets and/or the internet. References herein to microprocessor instructions or microprocessor-executable instructions, in accordance with the above, can be understood to include programmable hardware.

Unless otherwise stated, use of the word "substantially" can be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun can be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, can be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. For example, although the methods and systems are disclosed relative to exemplary embodiments for computer (microprocessor-device) defense/control, the methods and systems can be employed with other systems using a PO-MDP controller.

Many additional changes in the details, materials, and arrangement of parts, herein described and illustrated, can be made by those skilled in the art. Accordingly, it will be understood that the following claims are not to be limited to the embodiments disclosed herein, can include practices otherwise than specifically described, and are to be interpreted as broadly as allowed under the law.

TABLE I

KEY PROPERTIES OF AN AUTOMATED INTERNET WORM ATTACK

| Step | Attack Objectives | Candidate Countermeasures |
|---|---|---|
| | Phase I: Gain privileged access to victim's configuration | |
| 1 | Scan network and probe each computer in search of vulnerable victim | heighten awareness, scrutinize port activity. ignore suspicious source IP |
| 2 | Bypass security of an identified victim by exploiting the vulnerability | block entrance port, sleep/kill exploited process or service |
| | Phase 2: Inflict local damage on victim | |
| 3 | Download the payload onto the victim containing programs that propagate the attack | sleep/kill shell connection, sleep/kill download, block disk access |
| 4 | Install the downloaded programs to be executable by the victim | sleep/kill shell connection, delete payload. sleep/kill installation utility, block disk access |
| | Phase 3: Convert victim to an attacker | |
| 5 | Execute the installed programs that propagate the worm | halt operations and alert administrator to initiate recovery sequence |

TABLE II

KEY EVENTS AND PARAMETERIZATIONS FOR DATA COLLECTION IN EXPERIMENTATION

| Event Tag | Data Parameters | | | | |
|---|---|---|---|---|---|
| | | | Sensor Events | | |
| KER | time stamp | distance | | | |
| PID | time stamp | distance | process ID | process name | user name | user ID |
| IP | time stamp | distance | source IP | source port | destination IP | destination port |
| | | | Response Events | | |
| DFLT | time stamp | staging scheme | detection scheme | | |
| KILL | time stamp | staging scheme | detection scheme | targeting scheme | target process |
| RCVR | time stamp | staging scheme | detection scheme | | |
| | | | Truth Events | | |
| NRML | time stamp | client ID | load setting | | |
| ATCK | time stamp | step ID | step name | | |

What is claimed is:

1. A method for controlling a microprocessor system, the method comprising:

based at least in part on objectives of at least one electronic attack, using a partially observable Markov decision process (PO-MDP) for modeling at least part of the microprocessor system, the PO-MDP including a controller, the controller comprising:

an estimation policy to recursively generate a state estimate at stage k based on a state estimate at stage k−1, a control at stage k−1, and an observation at stage k, and, a response policy to select a control at stage k based on the state estimate at stage k, and cause the selected control to be provided to at least a part of the microprocessor system.

2. A method according to claim 1, where modeling includes collecting at least one training set based on a sample electronic attack.

3. A method according to claim 2, where collecting includes collecting from one or more sensors, where the one or more sensors are in communications with at least part of the microprocessor system.

4. A method according to claim 3, where collecting includes determining sensor observation probabilities.

5. A method according to claim 1, further comprising selecting the estimation policy and the response policy to minimize an average cost per stage.

6. A method according to claim 5, where selecting the response policy includes selecting based on at least one of: an infinite-horizon assumption and a multi-state look-ahead optimization technique.

7. A method according to claim 5, where selecting the estimation policy includes constructing a recursive estimator to provide a sufficient statistical state estimate.

8. A method according to claim 1, where modeling includes:
selecting the estimation policy based on minimizing an error per stage.

9. A method according to claim 8, where minimizing the error per stage includes determining a distance metric.

10. A method according to claim 9, where determining the distance metric includes determining a difference between an estimate of each state of the model, and the true state.

11. A method according to claim 9, where determining the distance metric includes computing a Euclidean norm.

12. A method according to claim 8, further comprising:
selecting the response policy based on a fixed estimation policy and minimizing the average cost per stage.

13. A method according to claim 12, where minimizing the average cost per stage includes determining a minimum cost-to-go based on the state estimate at stage k.

14. A method according to claim 1, further comprising:
receiving observations from one or more sensors at stage k, and,
associating the observations with observation probabilities based on the state estimate at stage k and the control at stage k−1.

15. A method according to claim 14, where receiving observations includes producing a distance measure based on the received observations.

16. A method according to claim 14, where receiving observations include applying the received observations to a detection scheme.

17. A method according to claim 16, where the detection scheme includes employing a Bayesian classifier.

18. A method according to claim 1, further comprising specifying at least one of: a state space associated with the model, a control space associated with the model, and an observation space associated with the model.

19. A method according to claim 1, further comprising specifying one or more state transition probabilities for a state at stage k+1 based on the state at stage k and a control at stage k.

20. A method according to claim 1, further comprising specifying one or more sensor observation probabilities for stage k based on a state at stage k and a control at stage k−1.

21. A method according to claim 1, where the system states includes states of at least one of an electronic intrusion and an electronic attack on at least a part of at least one of: a microprocessor-controlled device and a set of instructions.

22. A method according to claim 1, where the model is a stationary model.

* * * * *